(12) United States Patent
Gustafson et al.

(10) Patent No.: US 7,352,090 B2
(45) Date of Patent: Apr. 1, 2008

(54) FLUID-SUBMERGED ELECTRIC MOTOR

(75) Inventors: James R. Gustafson, Granby, MA (US); Douglas Parsons, Canton, CT (US); Kenneth Marks, Southwick, MA (US)

(73) Assignee: Hamilton Sundstrand, Windsor Locks, CT (US)

( * ) Notice: Subject to any disclaimer, the term of this patent is extended or adjusted under 35 U.S.C. 154(b) by 344 days.

(21) Appl. No.: 10/804,305

(22) Filed: Mar. 19, 2004

(65) Prior Publication Data

US 2005/0206258 A1    Sep. 22, 2005

(51) Int. Cl.
*K02K 9/00*    (2006.01)
(52) U.S. Cl. .......................................... 310/52; 310/87
(58) Field of Classification Search ............ 310/52–57, 310/87–88
See application file for complete search history.

(56) References Cited

U.S. PATENT DOCUMENTS

| 1,531,724 | A | * | 3/1925 | Arutunoff .................... 310/54 |
| 4,541,782 | A | * | 9/1985 | Mohn .......................... 417/244 |
| 4,749,894 | A | * | 6/1988 | Iwata et al. .................... 310/87 |
| 4,785,211 | A | * | 11/1988 | Erickson et al. ............... 310/57 |
| 5,034,638 | A | * | 7/1991 | McCabria ..................... 310/54 |
| 5,619,956 | A | | 4/1997 | Koziara |
| 5,930,852 | A | | 8/1999 | Gravatt |

FOREIGN PATENT DOCUMENTS

JP    60 257738 A    12/1985

OTHER PUBLICATIONS

European Search Report, dated Jul. 5, 2006.

* cited by examiner

*Primary Examiner*—Thanh Lam
(74) *Attorney, Agent, or Firm*—Carlson, Gaskey & Olds

(57) ABSTRACT

An electric motor has at least one component that is submerged in a cooling fluid held in a fluid-filled cavity. The stator, rotor, and rotor shaft bearings are all possible components that may be submerged. The cooling fluid floods the stator, rotor, and/or bearings to cool the components. The fluid may have a high electrical resistance to isolate the motor components from any contact with flammable gasses as well as prevent arcs or sparks. The cavity holding the fluid also ensures continuous lubrication by preventing fluid from leaking or evaporating out of the motor.

18 Claims, 3 Drawing Sheets

FLUID-SUBMERGED ELECTRIC MOTOR

TECHNICAL FIELD

The present invention is directed to electric starters, and more particularly to starters having electric motors.

BACKGROUND OF THE INVENTION

Large-scale power generators often use gas turbine engines to supply power to a geographic region. Reliable start up of these engines is critical to ensure that power outages do not occur.

Electric starters are known for starting small engines, but the special requirements of large engines have generally made them inappropriate for use with large engines. Many gas turbines in the 20 to 50 MW range are derivatives of aircraft engines (known as "aeroderivatives") and, as such, they initially retained the lightweight, high-performance pneumatic starters from the initial design. As applications evolved, the pneumatic starters were replaced with hydraulic starters because weight is less of a concern in ground-based gas turbine engines. The next logical step is to apply electric motors to replace the hydraulic starter units.

One of the challenges in designing electric starters is to create a high-performance electric motor with minimal packaging size and total weight. From the currently available electric motor technology (i.e., induction, switched reluctance, permanent magnet), permanent magnet motors offer the highest performance density.

More particularly, electric starters rely on electric motors to convert electrical input power into mechanical power in the form of rotational torque, which in turn is used to start an engine. High-density motors produce a significant amount of heat and therefore require an effective heat dissipation mechanism to avoid overheating of the motor components. The electrical resistance of the stator winding in the motor and the fluctuating magnetic field passing through the metallic stator and rotor are both sources of much of the heat in the motor. Moreover, the size and high power density of the motor generate too much heat to be effectively dissipated through air cooling. Liquid coolant may be used to dissipate heat, but coolant flow is typically provided by a positive displacement pump that is driven by the engine, which is in turn rotated by the starter, making the coolant unavailable during motor startup. Also, the motor torque and its associated current will be highest at startup, further aggravating the lack of heat dissipation from the motor.

Electric motors used in close proximity to gas turbine engines must be capable of operation in an environment that may contain flammable gases. Under certain conditions, electric motors may develop hot spots and/or electrical shorts, which can increase the risks of operating electric motors in a hazardous environment.

Additionally, currently-known electric motors require periodic replacement or relubrication of various components, such as rotor bearings. Although pre-lubricated bearings are often used, these bearings have limited useful life because the oil/grease tends to leak, evaporate, and break down over time. The resulting reduction in lubricity causes wear particles from the bearing to form and accumulate in the lubricant, causing the lubricant to act as an abrasive and hasten component wear.

There is a desire for an electric starter having a motor that can be effectively cooled and isolated to make it usable in a variety of applications and environments.

SUMMARY OF THE INVENTION

The present invention is directed to an electric starter having at least one electric motor component that is submerged in a cooling fluid held in a fluid-filled cavity. The stator, rotor, and rotor shaft bearings are all possible components that may be submerged. The cooling fluid floods the stator, rotor, and/or bearings to absorb heat from the components. The intimate contact between the fluid and the heat-generating components enhances heat dissipation because the fluid effectively absorbs and carries away heat from the components.

In one embodiment, the fluid has a high electrical resistance and also surrounds wires in the electric motor. In this way, the fluid can isolate the wires from any contact with flammable gasses as well as prevent arcs or sparks between wires. Further, the cooling effect of the fluid reduces the likelihood of localized hot spots in the motor.

The fluid may also act as a lubricant for the rotor shaft bearings. The cavity holding the fluid prevents the fluid from leaking or evaporating out of the motor, thereby ensuring continuous lubrication. This continuous fluid flow helps prevent abrasive wear particles from accumulating in the bearings.

DETAILED DESCRIPTION OF THE EMBODIMENTS

Figure 1:
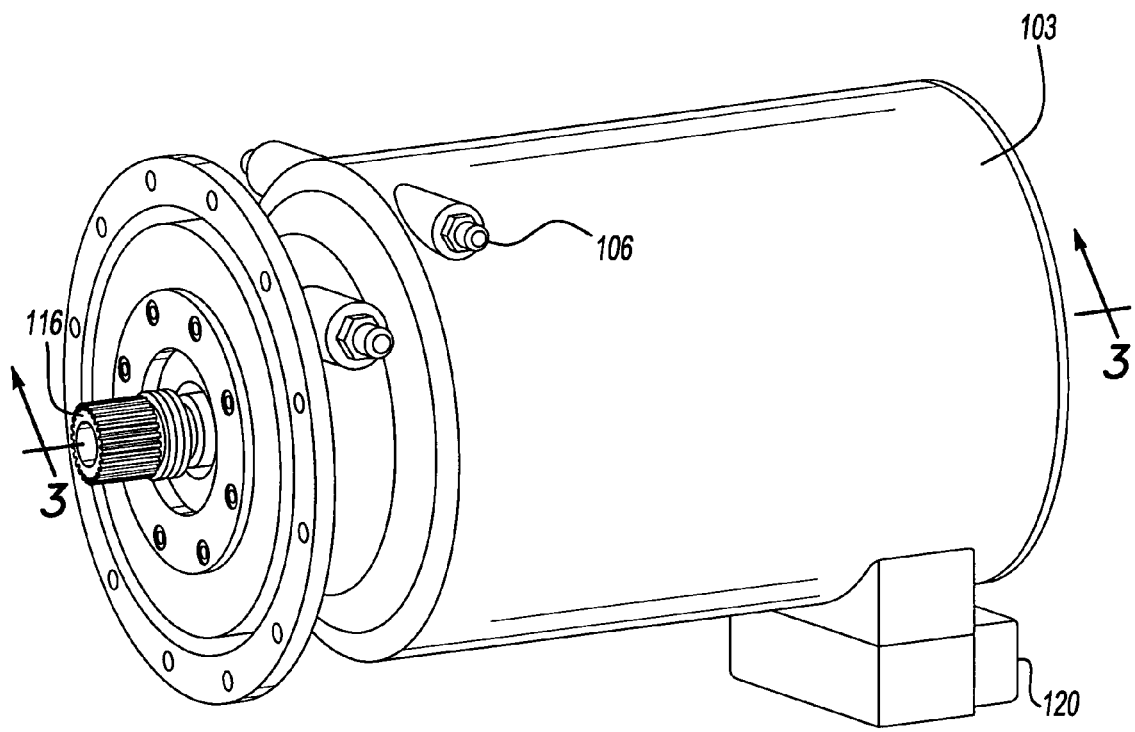
FIGS. 1 and 2 are perspective views of an electric starter according to one embodiment of the invention.
Figure 2:
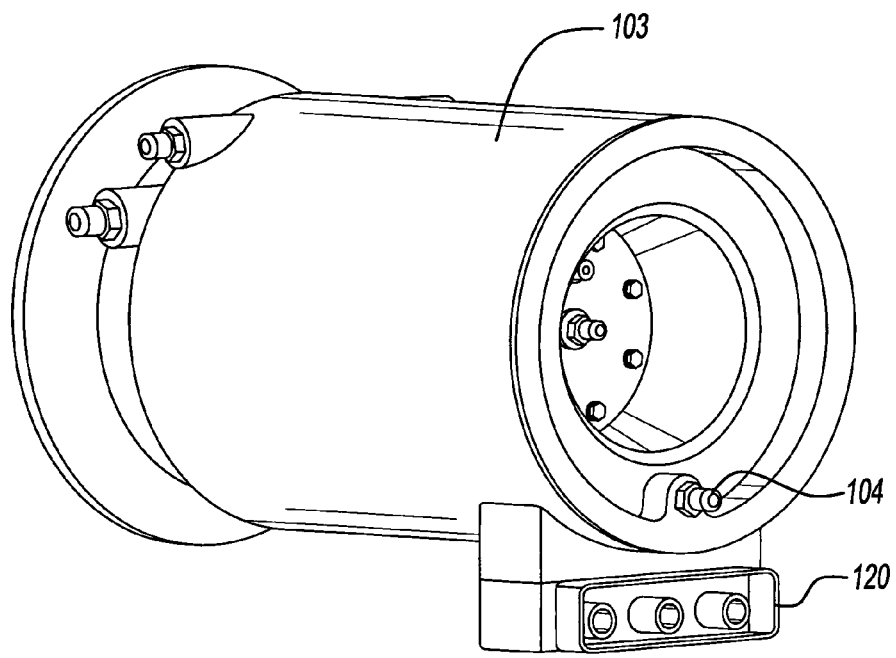

FIGS. 1 through 4 show an electric starter 100, having an electric motor 100a, such as a permanent magnet motor or switched reluctance motor, and a clutch 100b within a single package. In the embodiment shown in FIG. 3, the electric motor 100a is enclosed in a fluid-filled cavity 102 of a housing 103. The cavity 102 substantially encloses the motor 100a and has a fluid inlet 104 and a fluid outlet 106 to allow the fluid held in the cavity 102 to be circulated, removed and replaced when needed. The motor 100a itself can be any electric motor. As is known in the art, the motor 100a has a rotor 108, a stator iron 110, stator windings 112, and rotor bearings 114. The specific motor configuration does not affect the scope of the invention.

The cavity 102 can be filled with any fluid having heat conducting properties to ensure heat transfer from the motor components to the fluid. In one embodiment, the fluid is a dielectric oil, such as some commonly used synthetic gas turbine engine oils. Other fluids having similar characteristics may also be used. Regardless of the specific fluid used, the fluid should have appropriate viscosity, anti-foaming properties, thermal stability, thermal conductivity, and thermal capacity characteristics for the operating environment of the motor 100a to ensure effective heat transfer to the fluid.

Figure 3:
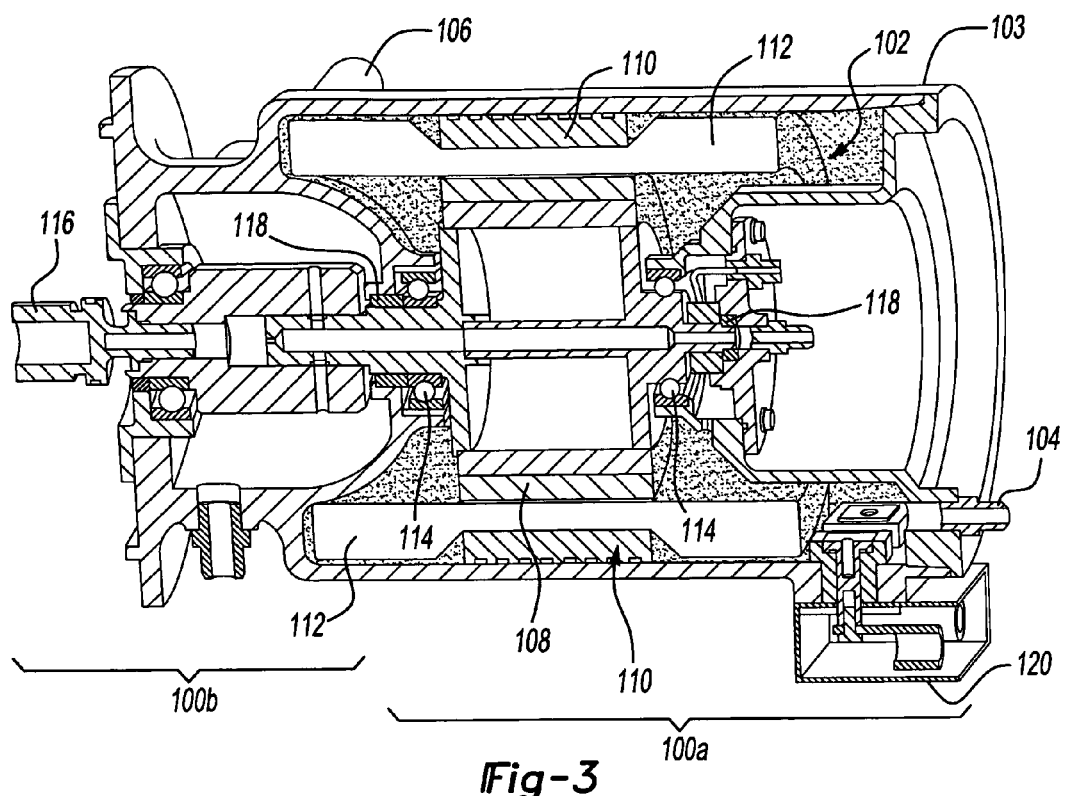
FIG. 3 is a section view of the electric starter shown in FIGS. 1 and 2, taken along line 3-3.
Figure 4:
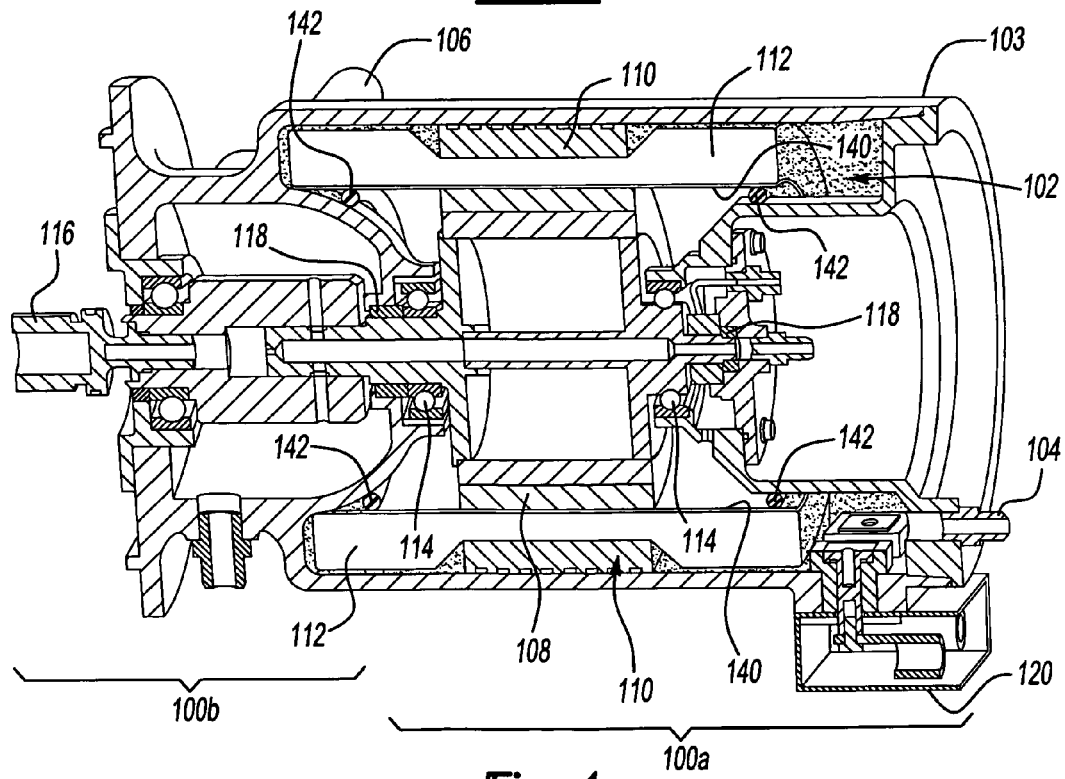
FIG. 4 is a section view of an electric starter according to another embodiment of the invention.

As shown in FIGS. 3 and 4, the rotor 108 rotates a rotor output shaft 116 that can be used to control any desired device. Shaft seals 118 prevent fluid from leaking out of the cavity 102.

As shown in FIGS. 1 through 4, electrical connectors 120 may be attached to the motor housing 103 to supply power to the motor coils.

Submerging parts of the motor 100a in the fluid rather than relying on air cooling or spray cooling ensures that the fluid is in constant intimate contact with heat-generating motor components and flows over all of the surfaces of the components, greatly improving the heat transfer rate away from the components over previously-used cooling methods. More particularly, the increased thermal mass of the pooled fluid against the heat sources in the motor 100a (e.g., the stator iron 110 and the wire in the stator windings 112), as opposed to the limited thermal mass of a sprayed fluid, and the resulting increased heat dissipation throughout the stator 100 or motor 100a reduces the likelihood that the motor 100a will reach its maximum acceptable operating temperature, even during intermittent operation. Instead, the fluid continuously absorbs enough heat to stabilize the motor temperature.

In one embodiment, the movement of the rotor 108 and other parts in the motor 100a causes the fluid to circulate around and through the cavity 102 as well. Because the motor 100a is constantly in contact with the fluid even when the fluid is not being circulated around and through the motor 100a, the fluid is available for conductive cooling of the motor components even when the motor 100a is just starting up, when thermal load is high, making effective thermal management possible even before the fluid begins fully circulating through the cavity.

In one embodiment, the fluid may also have a high electrical resistance to electrically isolate the wires in the stator winding 112, preventing them from shorting to each other, to the housing, and to other motor components. A dielectric oil would have this characteristic. Because the stator winding 112 is submerged in the fluid, the fluid is able to seep over and coat all of the surfaces of the winding 112. By using a fluid that is both electrically resistive and has thermal stability (e.g., at the boiling and flash points), the fluid eliminates the possibility of contact between the winding 112 and any flammable gases in the environment surrounding the motor 100a. The thermal management provided by the fluid also reduces localized high temperature areas ("hot spots") that could act as an ignition source for flammable gases. The housing 103 also helps shield the motor 100a from flammable gases by preventing gases from intruding into any portion of the motor 100a. This eliminates the need to purge the interior crevices of the motor 100a with inert gas because the crevices are already filled with the fluid.

In one embodiment, the fluid held in the cavity 102 may also act as a lubricant to lubricate the motor components, such as the rotor bearings 114. The submerged motor components avoids the problems encountered in pre-lubricated bearings and in flooded or splash lubricated bearings because the housing 103 ensures that the fluid is kept in constant contact with the components even when the rotor 108 is not rotating for a long, hot period. As a result, the lubricant cannot evaporate or leak away from the components, nor is there any time where the amount of lubricant on the components drops to an undesirable level, as may be the case with flooded or splash lubricated components where lubrication is applied only sporadically to the component surfaces.

Using the same fluid for both thermal management and lubrication allows the inventive structure to solve many existing problems at once. By flooding the motor components in a cooling, lubricating fluid, such as a dielectric oil, the inventive structure can provide effective thermal management, isolate the motor from flammable gases, and provide continuous lubrication all at the same time. These features are especially effective in starter applications, where the cooling capacity is normally low if air cooling is employed. Although the illustrated embodiment shows an entire motor that is submerged in the cavity 102, it is also possible to design the cavity 102 to submerge only selected components of the motor 100a without departing from the scope of the invention.

FIG. 4 illustrates an embodiment where the starter 100 is partitioned so that the rotor 108 is separated from the stator iron 110 and stator windings 112. More particularly, a can-shaped partition 140 connected to the fluid inlet 104 and the fluid outlet 106 encloses the rotor 108. The space between the outside of the partition 140 and the housing 103 forms the fluid-filled cavity 102, causing the fluid to surround only the stator components and not the rotor 108 in this embodiment. The ends of the partition 140 may be sealed to the housing 103 with O-rings or other sealing devices 142. The partition 140 is made of non-magnetic material so that flux passes through the partition 140 to couple the rotor 108 with the stator 110, 112.

Figure 5:
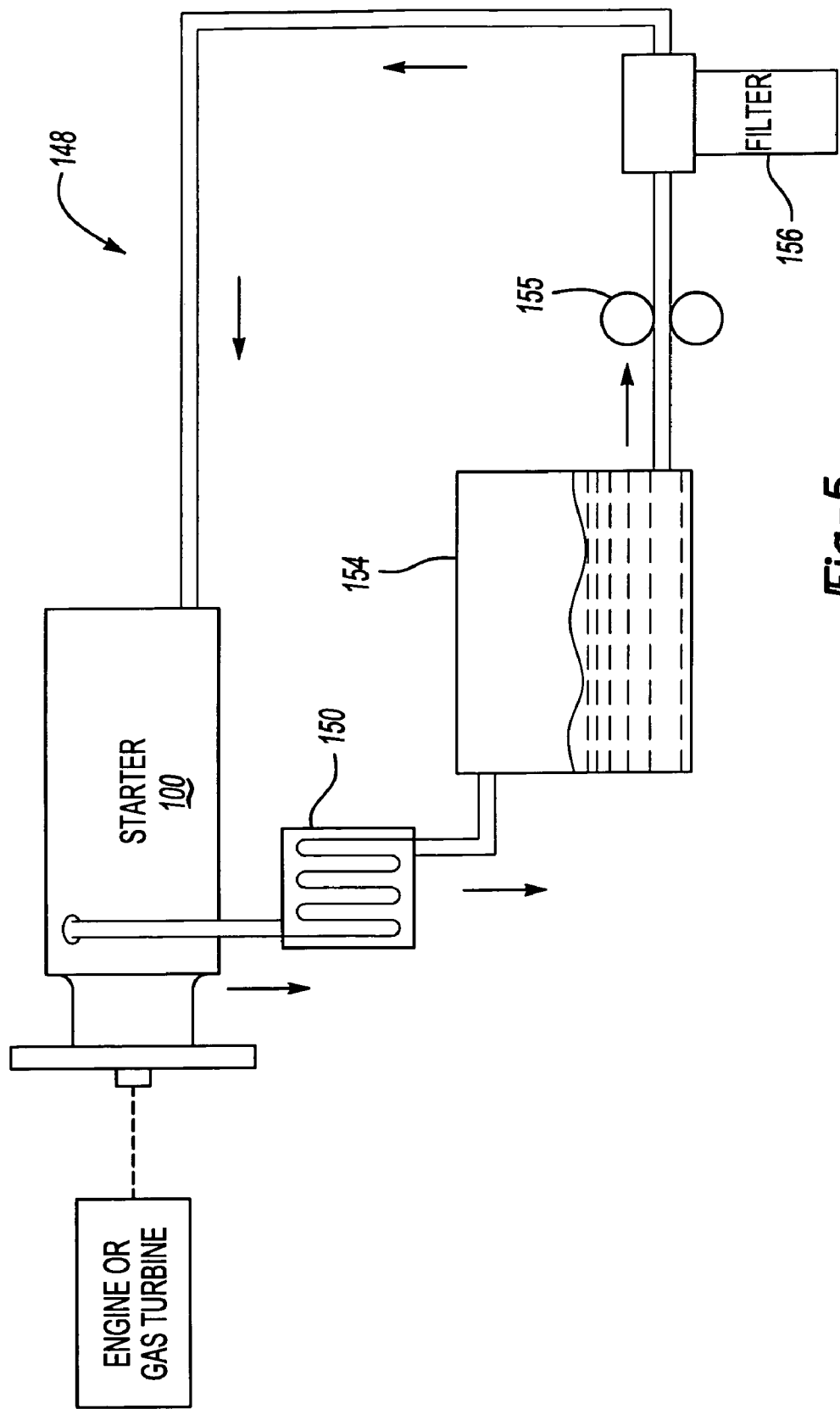
FIG. 5 is a representative diagram of an engine starter system using an electric starter according to one embodiment of the invention.

Referring to FIG. 5, the starter 100 may be one component of an overall engine starter system 148 that includes a heat exchanger 150, an external fluid reservoir 154, a fluid pump 155 and a filter 156. The fluid pump 155 circulates the fluid into the fluid inlet 104, through the cavity 102 and out of the fluid outlet 106 to remove fluid that has been heated by the motor components out of the cavity 102 and replenish the cavity with fresh fluid. The heat exchanger 150 receives the heated fluid from the starter 100 and removes the heat from the fluid before sending the fluid to the fluid reservoir 154. The fluid reservoir 154 is selected to be large enough to hold a sufficient volume of fluid that ensures adequate heat transfer of the fluid in the starter 100. The filter 156 removes any foreign objects, such as wear particles, that may have accumulated in the fluid before the fluid is sent back through the inlet 104 into the starter 100.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. An electric motor assembly, comprising:
   a fluid circulation circuit;
   a housing having a cavity that is fluidly connected to said fluid circulation circuit;
   an electric motor having at least one electric motor component disposed in the cavity; and
   a thermally conductive dielectric fluid for circulation through the cavity to substantially submerge said at least one electric motor component.

2. The assembly of claim 1, wherein the housing further comprises a cylindrical partition and the electric motor comprises a rotor, a stator iron, and a stator winding, the partition separating the rotor from the stator iron and the stator winding,
   wherein a space between an exterior portion of the partition and the housing forms a cavity, and wherein the thermally conductive dielectric fluid fills the cavity to substantially submerge at least one of the stator iron and the stator winding without contacting the rotor.

3. The assembly of claim 1, wherein the dielectric fluid is a dielectric oil.

4. The assembly of claim 1, wherein the housing has a fluid inlet and a fluid outlet, and wherein the system further comprises:
- a fluid pump that circulates the dielectric fluid through the fluid inlet into the cavity and out of the fluid outlet; and
- a fluid reservoir that houses excess dielectric fluid.

5. The assembly of claim 1, further comprising a heat exchanger in fluid communication with the dielectric fluid.

6. The assembly of claim 1, wherein said at least one electric motor component includes one of a rotor and a rotor bearing substantially submerged in said thermally conductive fluid.

7. The assembly as recited in claim 1, wherein said dielectric fluid is in fluid communication with a bearing which supports a rotor shaft.

8. The assembly of claim 1, wherein said at least one electric motor component comprises a rotor rotatable about a rotor axis, said rotor rotatable while substantially submerged in said dielectric fluid to circulate said dielectric fluid through said cavity.

9. The assembly of claim 1, wherein said fluid circulation circuit includes a portion that is outside of said housing.

10. The assembly of claim 1, wherein said electric motor includes a rotor output shaft that is coupled to a gas turbine engine, said engine in fluid communication with said fluid circulation circuit.

11. The assembly of claim 10, wherein said dielectric fluid comprises engine oil received from said engine through said fluid circulation circuit.

12. The assembly of claim 4, wherein said fluid inlet is an exclusive fluid input into said housing.

13. The assembly of claim 4, wherein said fluid outlet is an exclusive fluid outlet from said housing.

14. The assembly of claim 4, wherein said fluid outlet is an exclusive fluid outlet from said housing and said fluid inlet is an exclusive fluid input into said housing.

15. The assembly of claim 4, wherein said fluid pump is located between said fluid reservoir and said filter.

16. The assembly of claim 2, wherein said partition is a cylinder.

17. The assembly of claim 16, further comprising at least one seal member located radially inward of said partition and radially outward of said housing.

18. The assembly of claim 16, further comprising a first seal member located near a first end of said partition and a second seal member near a second, opposite end of said partition.

* * * * *

UNITED STATES PATENT AND TRADEMARK OFFICE
CERTIFICATE OF CORRECTION

PATENT NO. : 7,352,090 B2  
APPLICATION NO. : 10/804305  
DATED : April 1, 2008  
INVENTOR(S) : Gustafson et al.

Page 1 of 1

It is certified that error appears in the above-identified patent and that said Letters Patent is hereby corrected as shown below:

ON THE TITLE PAGE:

Item (73) Assignee: Hamilton Sundstrand, Windsor, Locks, CT (US) should read as --Hamilton Sundstrand Corporation, Windsor Locks, CT (US)--

Claim 15, Column 6, line 14: "said" should read as --a--

Signed and Sealed this

Eighth Day of July, 2008

JON W. DUDAS  
*Director of the United States Patent and Trademark Office*